United States Patent [19]
Kabe et al.

[11] Patent Number: 4,881,587
[45] Date of Patent: Nov. 21, 1989

[54] HEAVY DUTY PNEUMATIC RADIAL TIRE

[75] Inventors: Kazuyuki Kabe, Tokyo; Tatsuo Suzuki, Hayama; Ken Takahashi, Atsugi, all of Japan

[73] Assignee: The Yokohama Rubber Co., Ltd., Tokyo, Japan

[21] Appl. No.: 190,449

[22] Filed: May 5, 1988

[30] Foreign Application Priority Data

May 29, 1987 [JP] Japan .................................. 62-131592

[51] Int. Cl.$^4$ ................................................. B60C 9/20
[52] U.S. Cl. ..................................... 152/534; 152/536; 152/538
[58] Field of Search ................ 152/534, 535, 536, 538, 152/531, 526

[56] References Cited

U.S. PATENT DOCUMENTS

| | | | |
|---|---|---|---|
| 2,943,663 | 7/1960 | Antonson | 152/534 |
| 3,335,777 | 8/1967 | Hutch | 152/535 |
| 3,677,319 | 7/1972 | Mirtain | 152/531 |
| 4,037,637 | 7/1977 | Arimura et al. | 152/534 X |

FOREIGN PATENT DOCUMENTS 1272246  8/1961  France .................................. 152/534

Primary Examiner—Raymond Hoch
Attorney, Agent, or Firm—Armstrong, Nikaido, Marmelstein, Kubovcik & Murray

[57] ABSTRACT

An improvement in the structure of the belt portion of a heavy duty radial tire for use in trucks, large-size buses, small-sized trucks, etc., and more particularly, a heavy duty pneumatic radial tire improved with respect to the driving stability under heavy duty conditions while ensuring the durability of the tire (belt portion) during high speed running through the provision of at least three belt layers between the tread surface and the carcass layer of the tire and the specification of the relationships between the angles of the cords constituting these plurality of belt layers.

5 Claims, 3 Drawing Sheets

HEAVY DUTY PNEUMATIC RADIAL TIRE

BACKGROUND OF THE INVENTION

A heavy duty pneumatic radial tire generally comprises a pair of bead wires, a pair of side walls, and a plurality of belt layers disposed between a tread portion and a radial carcass layer.

In such a heavy duty radial tire, the radial carcass layer comprises at least one steel cord layer or organic fiber cord layer disposed at an angle of about 90° to the circumferential direction of the tire, while the belt layer comprises at least three layers for retaining and supporting the high inner pressure and high load of the heavy duty tire. At least one layer among these three layers in the belt layer is a reinforcing layer, and at least two layers constitute a tension-resistant layer. The reinforcing cords of the tension-resistant layer cross each other at an angle of 15° to 25°. On the other hand, the reinforcing layer is disposed on the outside of the tension-resistant layer (on the side of the ground-contacting portion of the tread) and has a width smaller than that of the tension-resistant layer. Further, the reinforcing layer has a relatively small cord angle to the circumferential direction of the tire and is disposed so as to cross or parallel the cords constituting the tension-resistant layer.

FIGS. 3 and 4 are a meridian half-crosssectional view of the above-described conventional pneumatic radial tire and a plain exploded view of the belt portion thereof, respectively.

In the drawings, a belt layer is laminated and disposed between a tread portion 2 and a carcass layer 3 of a tire 1. The belt layer comprises a belt reinforcing layer $V_1$ disposed adjacently to the tread portion 2 and having a cord angle of 15° to 25° between the cord direction and the circumferential direction (A—A' line) of the tire (i.e., the first layer disposed from the tread portion towards the carcass layer) and tension-resistant layers $V_2$ and $V_3$ for a belt portion 4 having a structure of at least two layers (i.e., the second and third layers disposed from the tread portion towards the carcass layer). The tension-resistant layers are laminated beneath the belt reinforcing layer $V_1$ so as to parallel or cross it and cross each other at a cord angle of 15° to 25° to the circumferential direction (A—A' line) of the tire.

Another known tire has a belt portion 4 in which an auxiliary belt layer $V_4$ having a cord angle of 40° to 75° between the cord direction and the circumferential direction (A—A' line) of the tire is additionally lamination-disposed between the above-described carcass layer 3 and the tension-resistant layers $V_2$ and $V_3$ of the belt portion 4.

In these radial tires, the carcass layer 3 has a single- or multi-layer structure, and the carcass cords have an angle of about 90° between the cord direction and the circumferential direction of the tire (i.e., substantially radially).

In the belt portion 4 of the above-described conventional tires, particularly the first to third belt layers, i.e., belt tension-resistant layers $V_1$, $V_2$, and $V_3$ in FIGS. 3 and 4 are made of cords disposed at the same angle from the standpoint of productivity. As shown in FIG. 4, the second belt layer $V_2$ and the third belt layer $V_3$ were disposed so as to cross each other at the same cord angle although the directions of the disposition of the cords are different from each other, while the first layer $V_1$ was disposed on the second layer $V_2$ in the same direction (or so as to cross each other) at the same belt angle as that of the second belt layer $V_2$ and the third belt layer $V_3$.

However, the conventional tires having the above-described structure were unsatisfactory with respect to the driving stability under heavy duty conditions because they are aiming principally at ensuring the durability of the belt portion during high speed running.

SUMMARY OF THE INVENTION

An object of the present invention is to provide a heavy duty pneumatic radial tire having the above-described structure (hereinafter referred to briefly as the 'radial tire') improved with respect to the driving stability under heavy duty conditions while ensuring the durability of the belt portion during high speed running.

DESCRIPTION OF THE PREFERRED EMBODIMENTS

Figure 1:
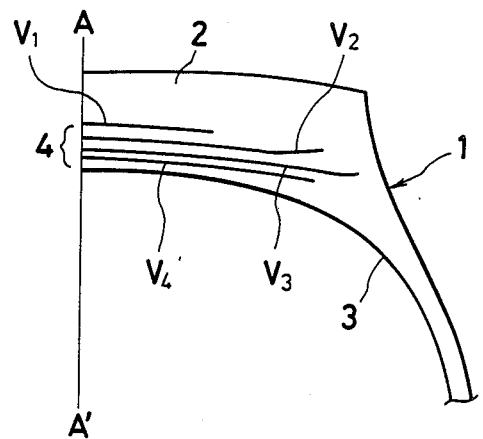
FIGS. 1 and 2 are a meridian half-crosssectional view showing an example of the heavy duty pneumatic radial tire of the present invention and an exploded view of the belt portion thereof, respectively.
Figure 2:
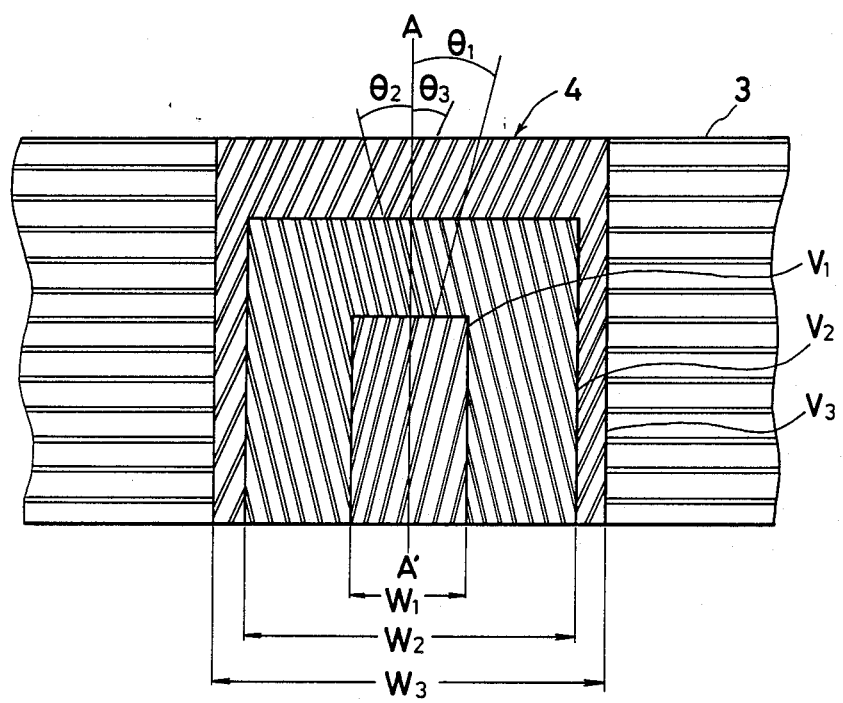
Figure 3:
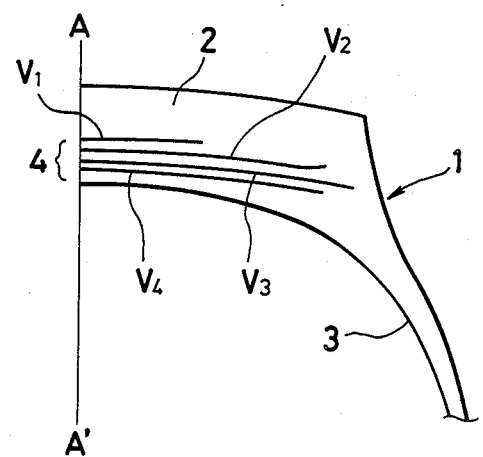
FIGS. 3 and 4 are a meridian half-crosssectional view showing an example of the conventional heavy duty pneumatic radial tire and an exploded view of the belt portion thereof, respectively.

In FIGS. 1 and 2, a belt portion 4 is disposed between a tread 2 and a carcass layer 3 of a radial tire 1. The belt portion 4 comprises at least three belt layers, i.e., a first belt layer $V_1$, a second belt layer $V_2$, and a third belt layer $V_3$ disposed from the tread 2 towards the carcass layer 3.

The carcass layer 3 may have a single or multi-layer structure.

The radial tire of the present invention must satisfy the relationships represented by the following formulae (I) to (IV):

(I) $\theta_1 < \theta_2 < \theta_3$,
(II) $10° < \theta_1 < 20°$,
(III) $0° < \theta_2 - \theta_1 < 5°$, and
(IV) $7° < \theta_3 - \theta_2 < 13°$.

(1) As stipulated by the formula (I), the belt layer $V_1$ is disposed in the utmost vicinity of the tread surface as shown in FIG. 2 so that the cords constituting the belt layer $V_1$ make the smallest angle $\theta_1$ with the circumferential direction of the tire (A—A' line), and the above-described belt layers $V_2$ and $V_3$ are successively laminated beneath the belt layer $V_1$ so that the angles $\theta_2$ and $\theta_3$ of the cords constituting the belt layers $V_2$ and $V_3$ to the circumferential direction of the tire are increased in that order.

(2) As stipulated by the formula (II), the value of $\theta_1$ ranges from 10° to 20°.

(3) As stipulated by the formula (III), a difference between $\theta_2$ and $\theta_1$, i.e., a value of $(\theta_2 - \theta_1)$, ranges from 0° to 5°.

(4) As stipulated by the formula (IV), a difference between $\theta_3$ and $\theta_2$, i.e., a value of $(\theta_3 - \theta_2)$, ranges from 7° to 13°.

On the assumption that the relationships represented by the above-described formulae (I) to (IV) are satisfied, it is preferred that the angles of the disposition of the belt layers $V_2$ and $V_3$, i.e., $\theta_2$ and $\theta_3$, be 14° to 17° and 24° to 27°, respectively.

The relationship of the above item (1) will now be described.

In general, the cords constituting the carcass layer of the radial tire are disposed in the cross-sectional direction of the tire (i.e., a direction crossing the circumferential direction of the tire), while the cords constituting the belt layer is disposed at a small angle to the circumferential direction of the tire (A—A' line). The so-called hoop effect is attained by dispositions of the belt layer.

The relationship of the above item (1) is necessary for maintaining the continuity with respect to the change in the angle of the constitutional cords from the carcass layer of the tire to the outermost layer of the belt portion. Specifically, a unidirectional reinforcing rubber layer constituting the belt layer (in which the reinforcing cords are drawn to put them in order and disposed in a given direction in the rubber) has a rigidity of the reinforcing cord in the direction parallel with the cord, while it can retain only the rigidity of the rubber itself in the direction crossing the cords. In order to ensure the rigidity in the circumferential direction of the tire and the cross-sectional direction of the tire (i.e., a direction crossing the circumferential direction of the tire) with respect to the whole belt portion, it is necessary to laminate the above unidirectional reinforcing rubber layers on the bias.

On the other hand, the bias-laminated structure of the belt layer causes an interlaminar shear stress at both ends of each layer. The smaller the cord angle of the belt layer to the circumferential direction of the tire, the larger the interlaminar shear stress. This is disadvantageous from the standpoint of the prevention of the belt edge separation. In general, the interlaminar shear stress of the belt edge portion decreases with an increase in the cord angle of the belt layer to the circumferential direction of the tire. This is advantageous from the standpoint of the prevention of the separation but causes a reduction in the so-called hoop effect of the belt portion.

For this reason, in the present invention, the durability of the tire is improved through effective prevention of the separation of the belt edge portion of the radial tire by disposing at least three belt layers having the cord angles $\theta_1$, $\theta_2$ and $\theta_3$ satisfying the relationship $\theta_1 < \theta_2 < \theta_3$ to ensure the continuity of the rigidity in the circumferential direction of the tire and the cross-sectional direction of the tire from the belt layer $V_1$ to the carcass layer, particularly by making the cord angle $\theta_3$ of the belt layer $V_3$ larger than the cord angle $\theta_2$ of the belt layer $V_2$ as the tension-resistant layer.

The relationship of the above item (2) shows that the rigidity of the belt layer $V_1$ disposed on the side of the ground-contacting portion of the tire has a greater effect on the cornering characteristics of the tire than that of the rigidity of the other belt layers $V_2$ and $V_3$. An improvement in the driving stability, particularly the response of the driving stability can be attained through an increase in the belt rigidity and the cornering power of the radial tire of the present invention by setting the angle $\theta_1$ of the cords constituting the belt layer $V_1$ to the circumferential direction of the tire at 10° to 20°.

The relationship of the above item (3), i.e., a value of $(\theta_2 - \theta_1)$ ranging from 0° to 5°, preferably from 2° to 5°, shows that the cord angle $\theta_2$ of the belt layer $V_2$ is decreased as much as possible while satisfying the continuity of the angle $\theta_2$ of the cords constituting the belt layer $V_2$ adjacent to the belt layer $V_1$. That is, in order to form a bias-laminated belt structure from these belt layers and to attain the function as the so-called hoop of the belt portion while maintaining the balance of the orientation of the cords, it is necessary that, for example as shown in the exploded plan view of the belt portion of a radial tire of FIG. 2, the cords of the belt layer $V_1$ adjacent to the tread portion and the cords of the belt layer $V_3$ adjacent to the carcass layer are arranged to be acclivous in the direction of from left to right, while the cords of the belt layer $V_2$ disposed between the belt layers $V_1$ and $V_3$ are arranged to be declivous in the same direction of from left to right. Further, the directional stability of belt layers can be improved by arranging the cords of the belt layer $V_2$ to run at a descending inclination in the direction of from left to right.

Finally, the relationship of the above item (4) is one which has been experimentally found for satisfying the continuity of the angle $\theta_3$ of the cords constituting the belt layer $V_3$ provided in the utmost vicinity of the carcass layer and, at the same time, improving the driving stability.

That is, an improvement in the driving stability of the radial tire can be attained by setting the value of $(\theta_3 - \theta_2)$ described in the above item (4) at 7° to 13°, preferably 7° to 10°.

With respect to the belt layer constituting the radial tire of the present invention as a whole, the cords of the belt layer $V_1$ disposed adjacent to the tread surface makes a small angle $\theta_1$ 'with the circumferential direction of the tire, while the angle $\theta_3$ of the cords of the belt layer $V_3$ adjacent to the carcass layer should be determined, taking into consideration the relationship thereof with the angle of the cords constituting the carcass layer (relative to the cross-sectional direction of the tire). Specifically, it is preferred that the cord angle $\theta_3$ of the belt layer $V_3$ is similar to the cord angle of the carcass layer rather than the cord angle of the belt layer $V_2$. This cord angle contributes to an increase in the rigidity (bending rigidity) in the cross-sectional direction of the tire, thus enabling an improvement in the stability during running of the radial tire. However, with the consideration of the fact that the belt layer $V_3$ adjacent to the carcass layer is responsible for the hoop effect of the belt portion, it is preferred that both the driving stability and the hoop effect are improved by setting the value of $(\theta_3 - \theta_2)$ at 7° to 10°.

In the present invention, the cords constituting the at least three belt layers (e.g., $V_1$, $V_2$ and $V_3$) are arranged so that the cords between the layers adjacent to each other cross each other. The crossing of the cords between the belt layers adjacent to each other enables an increase in the apparent bending rigidity within the plan accompanying the occurrence of the interlaminar shear stress between the individual belt layers, thus improving the driving stability of the radial tire.

Further, the width of the plurality of belt layers constituting the radial tire of the present invention is increased from the ground-contacting area of the tread towards the carcass layer. Specifically, it is preferred that the width $W_1$ of the belt layer $V_1$, the width $w_2$ of the belt layer $V_2$, and the width $w_3$ of the belt layer $V_3$ satisfy the relationship represented by the following formula (see FIG. 2): $w_1 < w_2 < w_3$.

That is, with respect to the belt layer as a whole, a gradual decrease in the bending rigidity distribution in the cross-sectional direction of the tire from the center of the tread to the end portion of the tread can ensure the continuity of the change in the bending rigidity in the reinforcing structure of the belt portion from the outermost layer of the belt portion to the carcass layer. This not only improves the driving stability but also serves as an effective countermeasure against the occurrence of a wandering phenomenon on a rutted road.

Figure 5:
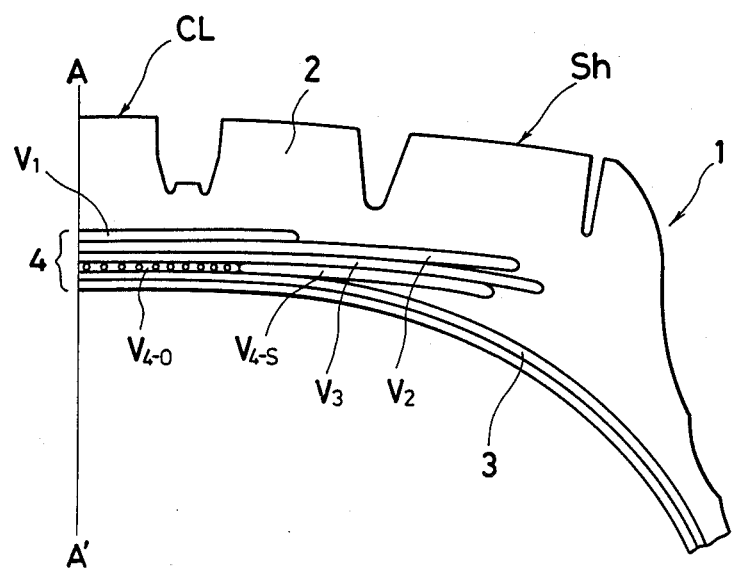
FIG. 5 is a meridian half-crosssectional view showing another example of the tire of the present invention.

Further, as described above, in the radial tire of the present invention, at least one belt layer $V_4$ can additionally be provided as far as the angles (i.e., $\theta_1$, $\theta_2$, and $\theta_3$) of the cords constituting the three belt layers (i.e., $V_1$, $V_2$, and $V_3$) disposed between the tread portion and the carcass layer satisfy the relationships represented by the above described formulae (I) to (IV). For example, FIG. 5 is a meridian half-crosssectional view, showing an example of this kind of tire. As shown in the drawing, four belt layers, i.e., belt layers $V_1$, $V_2$, $V_3$, and $V_4$, are disposed between the tread 2 and the carcass layer 3 of the radial tire. The shoulder portions Sh of the fourth belt layer ($V_4$) disposed in the utmost vicinity of the carcass layer 3 among these belt layers each comprise a steel cord layer $V_{4-s}$, while the central portion CL of the tire comprises an organic fiber cord layer $V_{4-o}$. The provision of the above-described auxiliary belt layer $V_4$ contributes to an improvement in the durability of the belt portion of the radial tire according to the present invention.

It is preferred that the belt layer of the radial tire of the present invention is composed mainly of a steel cord. Further, other various fiber cords, particularly fiber cords having high strength and high modulus of elasticity, such as aramid fiber ('Kevlar'; a product of E.I. du Pont de Nemours & Co.), may also be used together as far as the belt cord is composed mainly of a steel cord.

The present invention will now be described in more detail with reference to examples.

The durability of the belt portion and the driving stability were evaluated according to the values obtained in the measurement by the following method.

Evaluation of durability of belt portion

The extent of growth of the outer periphery of the tire was measured after running under conditions of an air pressure of 7.25 kg/cm², a load of 75% of JIS maximum load, a speed of 81 km/hr, and a travel time of 10 hr. The durability of the tire was judged from the stability of the dimension determined by the extent of the above-measured growth.

With respect to the criterion, when the stability of the dimension corresponded to the growth of 10% or less, the durability of the belt portion was judged as sufficient based on the knowledge obtained up to now.

Evaluation of driving stability

The driving stability was evaluated by a feeling test through running of an actual vehicle on a test course.

When the rating of the feeling on the basis of 100 is 70 percent or higher, the tire was regarded as an acceptable product.

vehicle: dual-drive four-wheeler
rim: 700T×20
air pressure: 7.25 kg/cm²
load: front wheel: 5.2 ton/axle
rear wheel: 9.0 ton/axle

EXAMPLE 1

Belt layers $V_1$, $V_2$, and $V_3$ having a steel cord structure and a belt structure (end count of cords and width) as shown in Table 1 were used to manufacture radial tires A to K and M having a tire size of 10.00 R 20 14 PR and a rib pattern and further having the angles ($\theta_1$, $\theta_2$, and $\theta_3$) of the cords constituting the belt layers and the arrangement of the belt cords as shown in Table 2. Further, separately, a tire L which will be described later was also manufactured.

Figure 4:
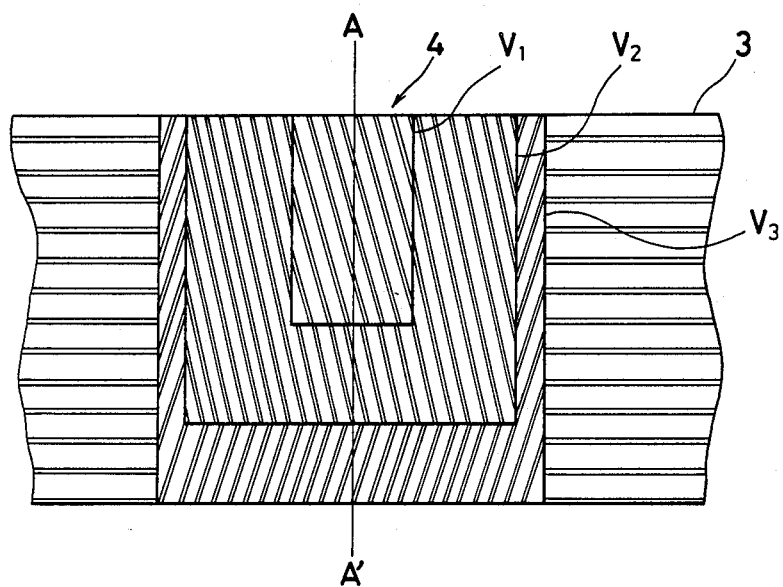

The cords constituting the belt layers, $V_1$, $V_2$, $V_3$ were allowed to cross each other as shown in FIGS. 2 and 4.

Among these tires, tires C, D, E, F, G, K, and M are tires of the present invention, tires A and B are conventional tires, and tires H, I, J, and L are comparative tires.

Tire L is the same as tire C except that $w_1$, $w_2$, and $w_3$ of tire L are each 160 cm.

Further, in all of tires A to K and M, $w_1$, $w_2$, and $w_3$ are 70 mm, 160 mm, 175 mm, respectively.

Tire M is provided with a fourth belt layer $V_4$ having a total width of 160 mm which has been formed by implanting Nylon 66 cords of 1890D/2 (strength: 40 kg) at a cord angle of 0° with an end count of 8.4 cords/cm over a width of 60 mm to form an intermediate layer and then implanting a steel cord of 3(0.20)+6(0.38) on both sides of the intermediate layer at a cord angle of 60° with an end count of 4.4 cords/cm over a width of 50 mm (see FIG. 5).

The durability of the belt portion (stability of the dimension) and the driving stability of these tires were evaluated. The results are shown in Table 2.

TABLE 1

|  | steel cord | end count (cord/cm) | width (mm) |
|---|---|---|---|
| $V_1$ | 3(0.2) + 6(0.38) | 5.6 | ($W_1$) 70 |
| $V_2$ | " | 5.6 | ($W_2$) 160 |
| $V_3$ | " | 5.6 | ($W_3$) 175 |

TABLE 2

| Type of tire | widths (mm) of belt layers $V_1$, $V_2$, and $V_3$ | | | angle (°) of belt layer cords | | | arrangement of belt cords (crossing or parallel) | | growth of outer periphery of tire (mm) | evaluation of driving Stability (rating) | | | pass or fail on durability | pass or fail on driving stability |
| | $W_1$ | $W_2$ | $W_3$ | $\theta_1$ | $\theta_2$ | $\theta_3$ | $V_1$-$V_2$ | $V_2$-$V_3$ | | sharpness in handling | steering response | degree of roll angle in cornering | | |
| A conventional tire 1 | 70 | 160 | 175 | 18 | 18 | 18 | parallel | crossing | 8.7 | 69 | 70 | 68 | pass | fail |
| B conventional tire 2 | " | " | " | 22 | 22 | 22 | parallel | crossing | 12.5 | 70 | 72 | 72 | fail | pass |
| C tire 1 of the present invention | " | " | " | 14 | 15 | 24 | crossing | crossing | 7.0 | 73 | 73 | 73 | pass | pass |
| D tire 2 of the | " | " | " | 15 | 17 | 24 | crossing | crossing | 8.0 | 72 | 72 | 73 | pass | pass |

TABLE 2-continued

| | Type of tire | widths (mm) of belt layers $V_1$, $V_2$, and $V_3$ | | | angle (°) of belt layer cords | | | arrangement of belt cords (crossing or parallel) | | growth of outer periphery of tire (mm) | evaluation of driving Stability (rating) | | | pass or fail on durability | pass or fail on driving stability |
|---|---|---|---|---|---|---|---|---|---|---|---|---|---|---|---|
| | | $w_1$ | $w_2$ | $w_3$ | $\theta_1$ | $\theta_2$ | $\theta_3$ | $V_1$-$V_2$ | $V_2$-$V_3$ | | sharpness in handling | steering response | degree of roll angle in cornering | | |
| E | tire 3 of the present invention | " | " | " | 12 | 14 | 24 | crossing | crossing | 7.5 | 73 | 74 | 73 | pass | pass |
| F | tire 4 of the present invention | " | " | " | 12 | 14 | 27 | crossing | crossing | 7.5 | 73 | 73 | 73 | pass | pass |
| G | tire 5 of the present invention | " | " | " | 12 | 17 | 27 | crossing | crossing | 8.0 | 72 | 73 | 72 | pass | pass |
| H | comparative tire 1 | " | " | " | 12 | 14 | 20 | crossing | crossing | 8.5 | 71 | 72 | 69 | fail | fail |
| I | comparative tire 2 | " | " | " | 12 | 28 | 28 | crossing | crossing | 9.0 | 71 | 68 | 72 | fail | fail |
| J | comparative tire 3 | " | " | " | 14 | 24 | 15 | crossing | crossing | 9.5 | 69 | 67 | 71 | fail | fail |
| K | tire 6 of the present invention | " | " | " | 12 | 14 | 27 | parallel | crossing | 8.0 | 72 | 72 | 72 | pass | pass |
| L | comparative tire 4 | 160 | 160 | 160 | 14 | 15 | 24 | crossing | crossing | 5.0 | 73 | 71 | 68 | fail | fail |
| M | tire 7 of the present invention | 70 | 160 | 175 | 14 | 15 | 24 | crossing | crossing | 6.0 | 73 | 73 | 74 | pass | pass |

EXAMPLE 2

There was manufactured a tire J having the same structure as that of tire C of Example 1, except that the angles of disposition of the cords of the second and third belt layers were reversed (angle of disposition of cords of the second belt layer: 24°; angle of disposition of cords of the third belt layer: 15°). With respect to these tires C and J, the cornering power (CP) and the driving stability were evaluated. The results are shown in Tables 3 and 4, while comparing the data of the tires C and J with each other.

TABLE 3

| | tire C | tire J |
|---|---|---|
| CP | 245 kg/deg | 227 kg/deg |

Notes: air pressure: 7.2 kg/cm²
load: 2700 kg
rim: 700T × 20

TABLE 4

| | sharpness in handling | response steering | degree of roll angle in cornering |
|---|---|---|---|
| tire C | 72 | 73 | 72 |
| tire J | 69 | 68 | 73 |

I claim:

1. A heavy duty pneumatic radial tire for a road vehicle comprising at least three belt layers $V_1$, $V_2$, and $V_3$ disposed in that order between a tread and a carcass layer from the ground-contacting portion of said tread towards said carcass layer wherein the angles $\Theta_1$, $\Theta_2$, and $\Theta_3$ of cords constituting said belt layers $V_1$, $V_2$, and $V_3$, respectively, relative to a circumferential tire plane satisfy the relationships represented by the following formulae (I) to (IV):

(I) $\Theta_1 < \Theta_2 < \Theta_3$,
(II) $10° < \Theta_1 < 20°$,
(III) $0° < \Theta_2 - \Theta_1 < 5°$, and
(IV) $7° < \Theta_3 - \Theta_2 < 13°$.

2. A heavy duty pneumatic radial tire according to claim 1, wherein a difference between said angle $\theta_2$ and said angle $\theta_1$ represented by the formulae $(\theta_2 - \Theta_1)$ is 2° to 5° and a difference between said angle $\theta_3$ and said angle $\theta_2$ represented by the formulae $(\theta_3 - \theta_2)$ is 7° to 10°.

3. A heavy duty pneumatic radial tire according to claim 1, wherein the width $w_1$ of said belt layer $V_1$, the width $w_2$ of said belt layer $V_2$, and the width $w_3$ of said belt layer $V_3$ satisfy the relationship represented by the following formula: $w_1 < w_2 < w_3$.

4. A heavy duty pneumatic radial tire according to claim 1, wherein a belt layer $V_4$ comprising a steel cord constituting both shoulder portions and an organic fiber cord constituting a crown central portion arranged between the shoulder portions and is disposed between the carcass layer and the belt layer $V_3$.

5. A heavy duty pneumatic radial tire according to claim 1, wherein said belt layers adjacent to each other are laminated so that the cords constituting said belt layers cross each other.

* * * * *